United States Patent [19]
Kim et al.

[11] Patent Number: 5,438,848
[45] Date of Patent: Aug. 8, 1995

[54] PRODUCT FREEZER UTILIZING A STIRLING CYCLE REFRIGERATOR

[75] Inventors: Seong T. Kim; Gwan S. Cho, both of Seoul, Rep. of Korea

[73] Assignee: Goldstar Co., Ltd., Seoul, Rep. of Korea

[21] Appl. No.: 166,880

[22] Filed: Dec. 15, 1993

[30] Foreign Application Priority Data

Dec. 17, 1992 [KR] Rep. of Korea .............. 24714/1992

[51] Int. Cl.⁶ .............................................. A23G 9/00
[52] U.S. Cl. .......................................... 62/342; 62/6; 62/383
[58] Field of Search ............... 62/6, 340, 342, 383

[56] References Cited

U.S. PATENT DOCUMENTS

| | | | |
|---|---|---|---|
| 4,522,032 | 6/1985 | Nakamura | 62/6 |
| 4,773,233 | 9/1988 | Kawasumi et al. | 62/340 |
| 4,838,702 | 6/1989 | Torimitsu et al. | 62/342 |
| 4,843,826 | 7/1989 | Malaker | 62/6 |
| 4,928,502 | 5/1990 | Kumada et al. | 62/6 |
| 5,142,872 | 9/1992 | Tipton | 62/6 |

*Primary Examiner*—Ronald C. Capossela
*Attorney, Agent, or Firm*—Jacobson, Price, Holman & Stern

[57] ABSTRACT

A Stirling cycle refrigerator comprises a refrigerating force supplying section including a Stirling freezing unit driven in Stirling cycle, a motor for driving the Stirling freezing unit, and a first heat transmitting part for emitting a refrigerating force from the Stirling freezing unit; and a refrigerating force applying section including a case, a cover covering the case, a second heat transmitting part for receiving refrigerating force from the first heat transmitting part, and a freezing processing device for freezing contents in the case for a desired type. The refrigerating force applying section peforms freezing by means of the refrigerating force supplied by the refrigerating force supplying section. The Stirling cycle refrigerator enables rapid freezing of food and successive reiterative production of ice cream, being of a smaller size compared to a conventional refrigerator.

13 Claims, 6 Drawing Sheets

PRODUCT FREEZER UTILIZING A STIRLING CYCLE REFRIGERATOR

BACKGROUND OF THE INVENTION

1. Field of the Invention

The present invention relates to a Stirling cycle refrigerator, particularly to a household Stirling cycle refrigerator which enables rapid production of ice, rapid freezing of food, and successive reiterative production of ice cream.

2. Prior Art

Generally, the refrigerator is one of household appliances, which is capable of producing ice or ice cream, for storing food in frozen in a freezing compartment, and for storing food in a fresh food compartment to maintain freshness. However, in a general household refrigerator, because the temperature in a freezing room is −18° C. the rapid freezing of food is difficult and it usually takes long time of more than 18 hours to produce ice cream, and the successive reiterative production of an ice cream is impossible because the freeze-accelerating material must be used in producing ice cream.

Meanwhile, U.S. Pat. No. 4,522,032 granted to Nakamura discloses a Stirling cycle refrigerator which accomplishes an extremely low temperature in a freezing room. Said Stirling cycle refrigerator comprises a plurality of Stirling cycle refrigerator units, and a countercurrent heat exchanger which enables the heat exchange between the working fluids circulating in said refrigerator units, and by this construction, the freezing temperature can be lowered down to a range of from −269° C. to −270° C. in said Stirling cycle refrigerator.

However, in a general household refrigerator, an extremely low temperature range, from −269° C. to −270° C., is not always necessary because rapid freezing of food and rapid production of ice or ice cream can be effectively achieved by means of a temperature in a range of from −60° C. to −70° C. Particularly in said patented refrigerator, since a separate countercurrent heat exchanger is needed, the construction of the refrigerator is complicated and the manufacturing cost increases.

SUMMARY OF THE INVENTION

It is an object of the present invention to provide a Stirling cycle refrigerator in which rapid freezing of food and successive reiterative production of ice cream is possible without a separate countercurrent heat exchanger.

It is another object of the present invention to provide a Stirling cycle refrigerator in which rapid freezing of food and successive reiterative production of ice cream possible with much smaller volume than that of a conventional refrigerator.

To achieve above objects of the present invention, there is provided a Stirling cycle refrigerator comprising:

refrigerating force supplying means including a Stirling freezing unit driven in a Stirling cycle, a motor for driving said Stirling freezing unit, and a first heat transmitting part for emitting refrigerating force from said Stirling freezing unit; and refrigerating force applying means including a case, a cover covering said case, a second heat transmitting part for receiving refrigerating force from said first heat transmitting part, and freezing processing means for freezing contents in said case for a desired type, wherein said refrigerating force applying means performs freezing by means of the refrigerating force supplied by said refrigerating force supplying means.

Also, according to the present invention, there is provided another Stirling cycle refrigerator comprising:

refrigerating force supplying means including a Stirling module driven in Stirling cycle, and a heat insulating plate disposed at the middle part of said refrigerating force supplying means;

refrigerating force applying means including a middle plate disposed slidably at the middle part of said refrigerating force applying means, guiding means for guiding the movement of said middle plate, and freezing processing means for freezing contents in said refrigerating force applying means for desired type;

a heat transmitting part disposed between said refrigerating force supplying means and said refrigerating force applying means for transmitting refrigerating force from said refrigerating force supplying means to said refrigerating force applying means; and a case of heat insulating material enclosing said refrigerating force supplying means, said refrigerating force applying means, and said heat transmitting part, and at the upper part of said case being disposed a door to be pivotally opened.

BRIEF DESCRIPTION OF THE DRAWINGS

The above objects and other features and advantages of the present invention will become more apparent by describing the preferred embodiments thereof with reference to the accompanying drawings, in which.

DETAILED DESCRIPTION OF THE PREFERRED EMBODIMENTS

Figure 1:
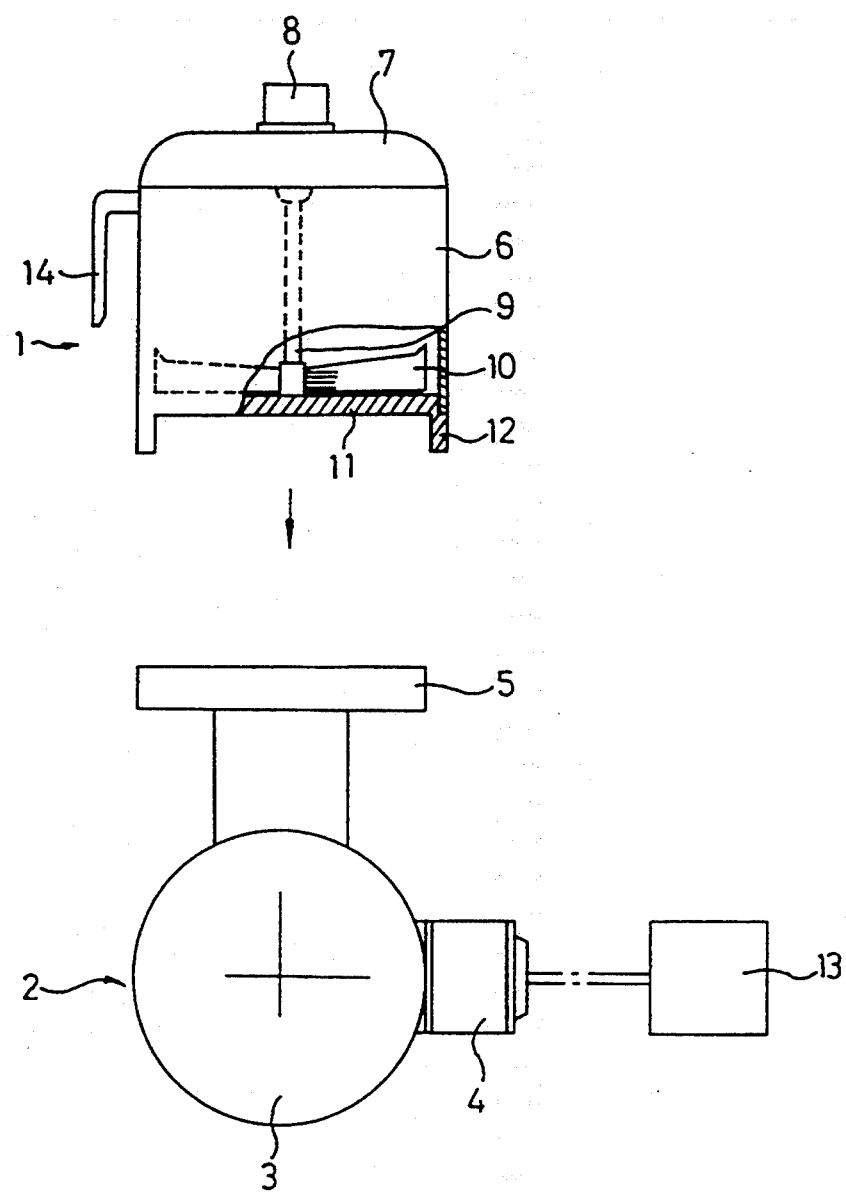
FIG. 1 shows a schematic construction of a Stirling cycle refrigerator according to one embodiment of the present invention.

Referring to FIG. 1 showing a schematic construction of a Stirling cycle refrigerator according to one embodiment of the present invention, said refrigerator comprises a refrigerating force supplying section 2 driven in a Stirling cycle, a refrigerating force applying section 1 performing freezing by means of the refrigerating force supplied by said refrigerating force supplying section 2. Said refrigerating force supplying section 2 includes a Stirling freezing unit 3, a motor 4 driving said Stirling freezing unit 3, and a first heat transmitting part 5 for emitting refrigerating force from said Stirling freezing unit 3. Said refrigerating force applying section 1 includes a case 6 of a predetermined shape, a cover 7 covering said case 6, a stirring motor 8 mounted on said cover 7, a stirring fan 10 disposed in said case 6 to be rotated by said stirring motor 8, and a second heat transmitting part 11 disposed at the base of said case for receiving refrigerating force from the first heat transmitting part 5 of said refrigerating force supplying section 2. At the periphery of the lower surface of said case, a holding wall is formed incorporated with the second heat transmitting part of said refrigerating force applying section 1, so that the outer peripheral wall and the upper surface of the first heat transmitting part 5 of the refrigerating force supplying section 2 are in contact, face to face, with the inner surface of the holding wall 12 and the lower surface of the second heat transmitting part 11 of the refrigerating force applying section.

In FIG. 1, the reference numeral 13 not described above designates a power and control circuit, 14 designates a doorknob.

Figure 2:
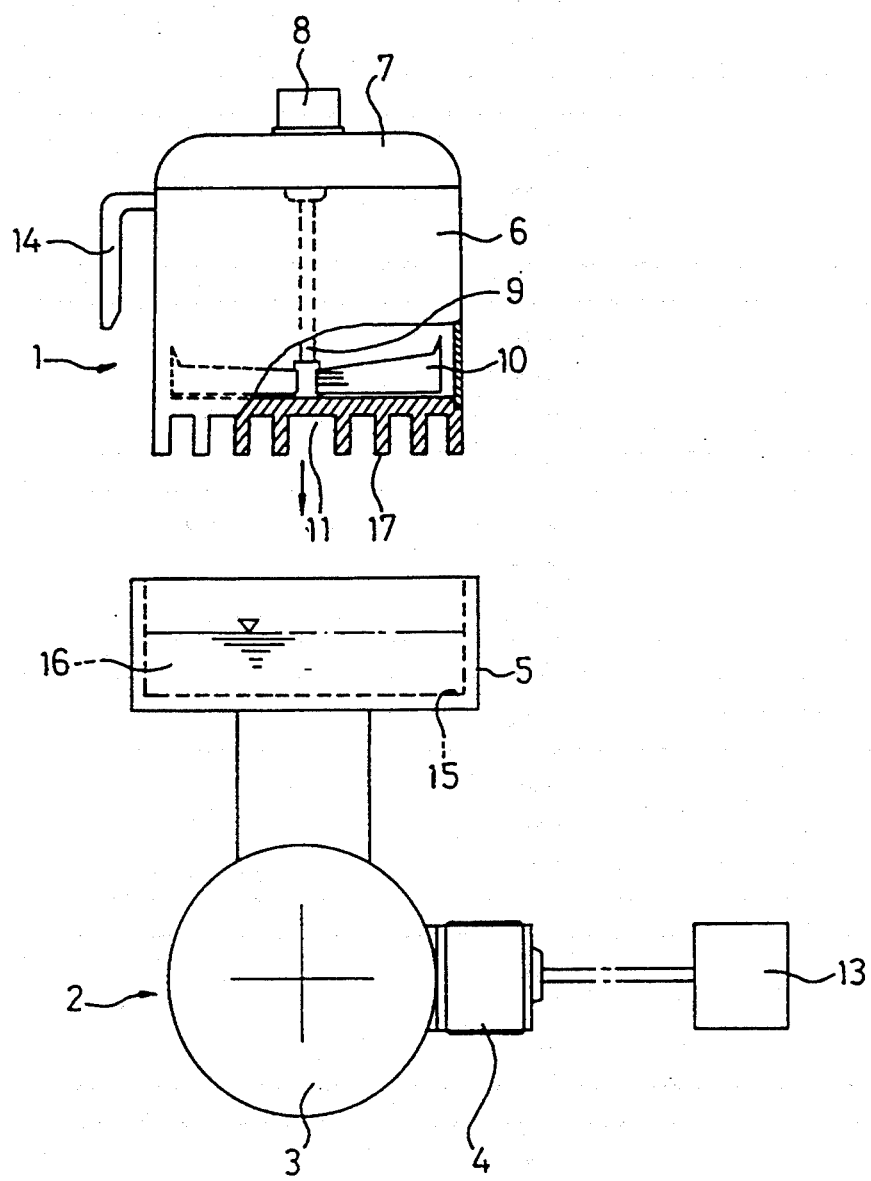
FIG. 2 shows a schematic construction of a Stirling cycle refrigerator according to another embodiment of the present invention.

Referring to FIG. 2 showing another embodiment of the present invention, a concave part of predetermined depth is formed at the first heat transmitting part 5 of the refrigerating force supplying section 2 and a heat transmitting medium such as brine is filled therein, a plurality of heat transmitting pins 17 are formed at the lower surface of the second heat transmitting part 11 of the refrigerating force applying section 1, so that heat transmitting is performed by means of the heat transmitting medium 16.

Figure 3:
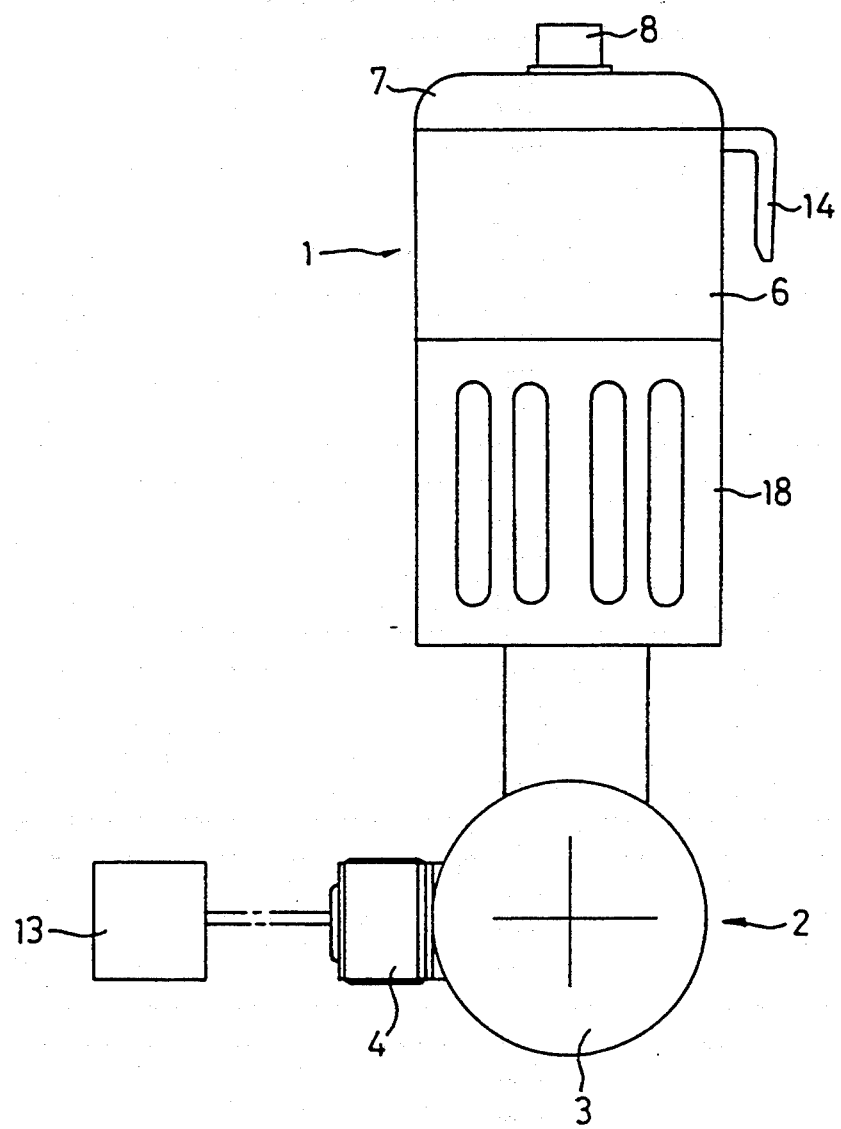
FIG. 3 shows a schematic construction of a Stirling cycle refrigerator according to another embodiment of the present invention.

Referring to FIG. 3 showing another embodiment of the present invention, heat pipes 18 are disposed between the refrigerating force supplying section 2 and the refrigerating force applying section 1, so that heat transmitting is performed via the heat pipes 18.

As mentioned above, a Stirling cycle refrigerator according to the present invention having such a construction may be used for rapid freezing of food and rapid production of ice or ice cream.

First, in case of rapidly freezing food, a stirring motor 8, a stirring shaft 9, and a stirring fan 10 is removed from the refrigerating force applying section 1 shown in FIG. 1-3, and instead, food is put in the case 6, and the refrigerating force applying section 1 is interconnected with the refrigerating force supplying section 2. And if electric power is supplied, the power and control circuit 13 is driven, and then the Stirling freezing unit 3 is driven, so that the temperature of the first heat transmitting part is lowered rapidly to a range of from $-60°$ C. to $-70°$ C. by the general function of the Stirling freezing unit 3, and then the refrigerating force from the refrigerating force supplying section 2 is transmitted to the second heat transmitting part 11 of the refrigerating force applying section 1 through the first heat transmitting part 5, thereby the food put in the case 6 can be frozen rapidly.

Figure 4:
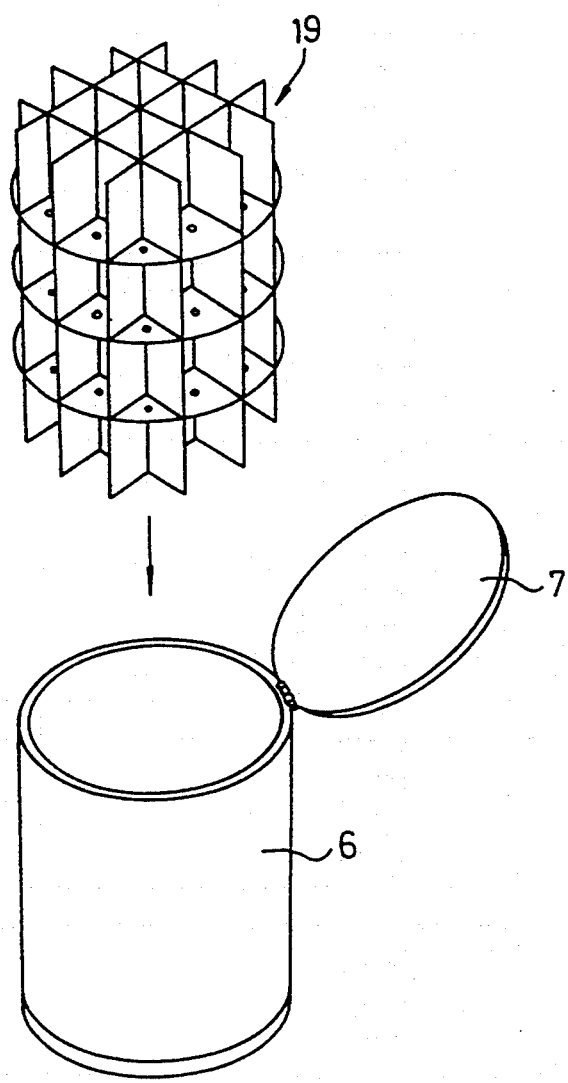
FIG. 4 is an exploded perspective view of a case and a heat transmitting lattice body therein of a refrigerating force applying part of a Stirling cycle refrigerator according to the present invention.

Meanwhile, in case of producing ice cream, as shown in FIG. 1-3, a stirring motor 8, a stirring shaft 9, and a stirring fan 10 are installed in the refrigerating force applying section 1, and then raw material of ice cream is put in the case 6 and stirred by stirring fan 10 with the interior of the case 6 refrigerated by the refrigerating force supplied by the refrigerating force supplying section 2, so that ice cream can be produced. In case of producing ice cubes, as shown in FIG. 4, a heat transmitting lattice body 19 is put in the case 6 of the refrigerating force applying section 1, so that ice cubes can be produced.

In addition, any appropriate construction suitable for other desired freezing types can be adapted, thereby various rapid freezing effects can be achieved.

Meanwhile, FIGS. 5 to 11 show other Stirling cycle refrigerators according to other embodiments of the present invention. Referring to the Stirling cycle refrigerator shown in FIG. 5, said refrigerator comprises a refrigerating force supplying section 24, a refrigerating force applying section 25, and a heat transmitting part 26 in a case 22 of heat insulating material. Said refrigerating force supplying section 24 includes a Stirling module 23 driven in a Stirling cycle, and a heat insulating plate 32 disposed at the middle part of said refrigerating force supplying section 24. Said refrigerating force applying section 25 includes a middle plate 27 disposed slidably at the middle part of said refrigerating force applying section 25, guiding rails 36, 36' guiding the movement of said middle plate 27, a motor 28 mounted on the apex of said case of heat insulating material, and a rotating shaft 29 connected to said motor 28 and a circulating fan 30 connected thereto. And, a heat transmitting part 26 is disposed between the refrigerating force supplying section 24 and the refrigerating force applying section 25 to transfer the refrigerating force from the refrigerating force supplying section 24 to the refrigerating force applying section 25, and a door 21 is pivotally disposed at the upper part of the case 22 of heat insulating material.

Figure 11A:
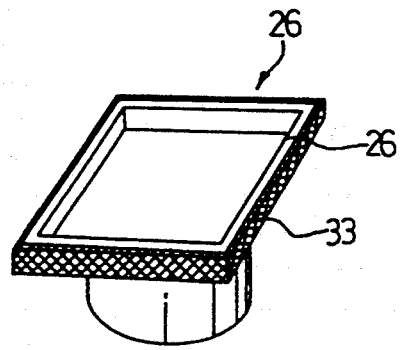
FIG. 11 A and B are perspective views of examples of a transmitting part of a Stirling cycle refrigerator shown in FIG. 5 or 6.
Figure 11B:
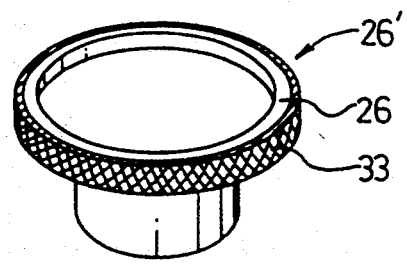

Said heat transmitting part 26 can be, as shown in FIG. 11 A and B, formed in a rectangular shape or a circular shape corresponding to the shape of a cross section of the case 22. A threshold 26a, is formed at the outer periphery of said heat transmitting part 26, and a sealing element 33 is attached to the outer surface of said threshold 26a to maintain a seal between the inner surface of the case 22 and said heat transmitting part 26, and a heat insulating coating 34 is formed at the lower surface of said heat transmitting part 26, and a heat insulating coating 34 is formed at the lower surface of said heat transmitting part 26.

Said middle plate 27 may be an open type middle plate 27' in a grill shape or a closed type middle plate 27" in a plane type, an air-tight element 35 is attached to the periphery of said closed type middle plate 35 to maintain air-tight between the inner surface of the wall and said closed type middle plate.

Said guiding rails 36 and 36' are formed at either side of the inner surface of the case 22 so that the peripheries of either side of said middle plate 27', 27" are guided in said guiding rails 36, 36'.

Figure 5A:
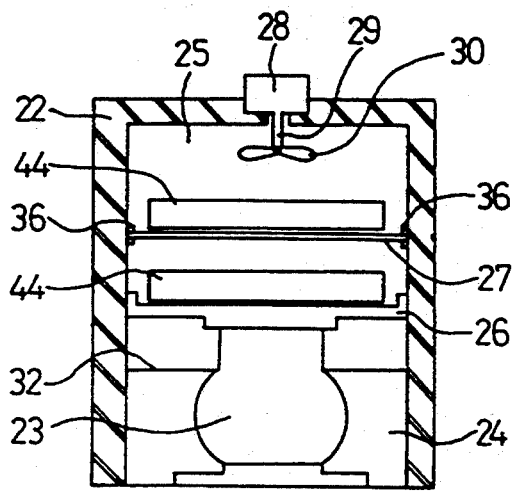
FIG. 5 A and B are schematic sectional and side sectional views of a Stirling cycle refrigerator according to another embodiment of the present invention.
Figure 5B:
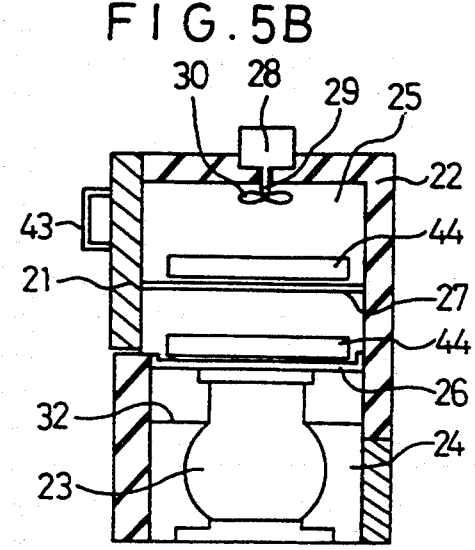
Figure 6:
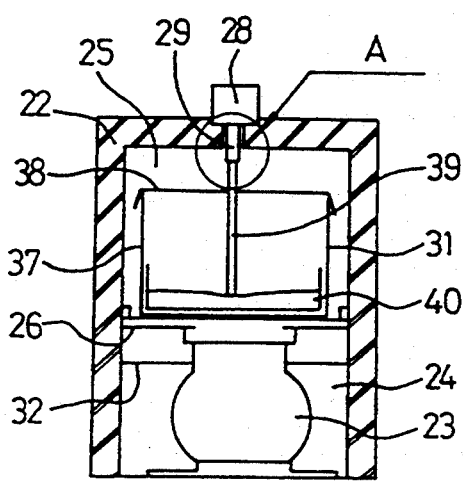
FIG. 6 is a schematic cross-sectional view of a Stirling cycle refrigerator according to another embodiment of the present invention.

A Stirling cycle refrigerator shown in FIG. 6 is similar to that shown in FIG. 5 but comprises an ice cream producing unit 31 instead of a circulating fan 30. Said ice cream producing unit 31 consists of a container 37 for producing an ice cream, a cover 38 covering said container 37, a stirring shaft 39 connected to a rotating shaft 29 of a motor 28 through the cover 38 to rotate in said container 37, and a stirring fan 40 connected to said stirring shaft 39.

Figure 7:
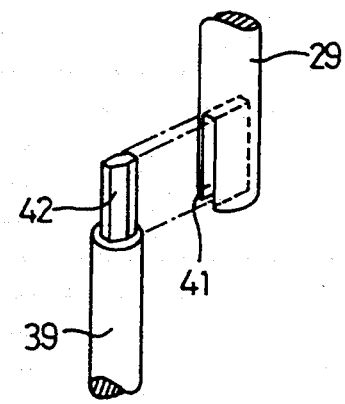
FIG. 7 is an exploded perspective view of A part in FIG. 6.
Figures 8A, 8B:
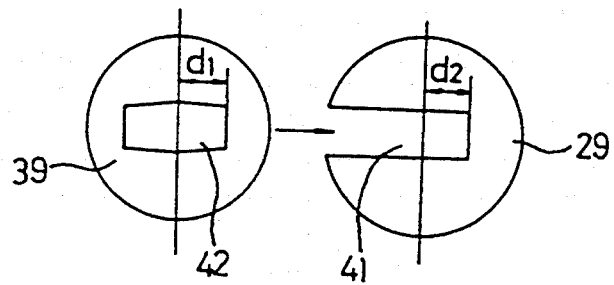
FIG. 8 A and B are cross-sectional view of A part in FIG. 6.

FIG. 7 and 8 show the construction of the connection between the rotating shaft 29 of said motor 28 and the stirring shaft 39 of the ice cream producing unit 31, in which a protrusion 42 formed at the upper part of the stirring shaft 39 is interposed in a groove 41 formed longitudinally at one side of the outer peripheral surface of the rotating shaft 29. Preferably, the depth d2 from the center of the groove 41 is equal to the bredth d1 from the center of the protrusion 42.

The reference numeral 43 designates a doorknob, 44 designates an ice box.

A Stirling cycle refrigerator according to one of the embodiments shown in FIG. 5–11 also can perform the functions of rapid producing of a small quantity of ice, rapid producing of a large quantity of ice, and producing ice cream.

Figure 9A:
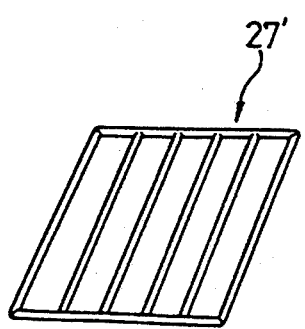
FIG. 9 A and B are perspective views of examples of a middle plate of a Stirling cycle refrigerator shown in FIG. 5 or 6.
Figure 9B:
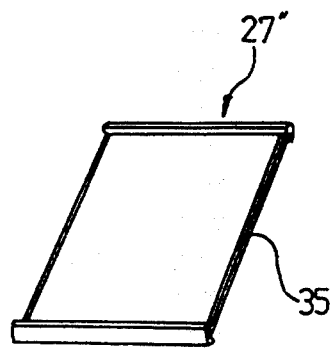
Figure 10:
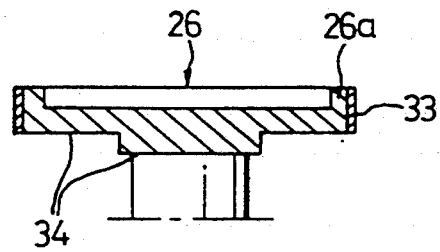
FIG. 10 is a cross-sectional view of an example of a transmitting part of a Stirling cycle refrigerator shown in FIG. 5 or 6.

First, in case of rapid producing of a small quantity of ice, a closed type middle plate 27" as shown in FIG. 9B is pushed in the case 22 through guiding rails 36, 36' formed at inner surfaces of either sides of the case 22 so that a small space is formed by said middle plate 27", inner surfaces of either sides of the case 22, and a heat transmitting part 26, an ice box 44 containing water is put on said heat transmitting part 26, and then the refrigerator is driven, thereby a small amount of ice is produced rapidly.

Meanwhile, in the case of rapidly producing a large amount of ice, an open type middle plate 27' as shown in FIG. 9A instead of said closed type middle plate 27" is pushed in the case 22 through said guiding rails 36, 36', ice boxes containing water are put on the heat transmitting part 26 and on the open type middle plate 27', and then the refrigerator is driven, thereby a large quantity of ice is produced. In these cases, by circulating the cooling air through the rotation of the circulating fan 30 by driving the motor 28, ice can be produced even more rapidly.

In the case of producing ice cream, the middle plate 27 is removed from the guiding rails 36, 36' of the case 22 and the stirring fan 40 is removed from the rotating shaft 29 of the motor 28, and an ice cream producing unit 31 is installed in the refrigerating force applying section 25 of the case 22. The protrusion 42 of the stirring shaft 39 of the ice cream producing unit 31 is interposed into the groove 41 formed in the rotating shaft 29 of the motor 28 as shown in FIG. 7 and 8.

The center part of the protrusion 42 of said stirring shaft 39 is thicker than either end parts of the protrusion 42 as shown in FIG. 7, so that the protrusion 42 can be more easily interposed into the groove 41 of the rotating shaft 29.

By driving the refrigerator after the stirring shaft 39 of the ice cream producing unit 31 is connected to the rotating shaft 29 of the motor 28 by the above-described method, the stirring shaft and the stirring fan rotate, thereby ice cream can be produced.

Meanwhile, in using a refrigerator according to the present invention, a liquid heat transmitting medium such as brine can be filled in the concave part formed on the upper surface of the heat transmitting part 26 to promote heat exchange at the heat transmitting part 26, and in this case the heat transmitting effect between the heat transmitting part 26 and an ice box or a container is doubled.

As described above, a Stirling cycle refrigerator according to the present invention enables rapid production of ice, rapid freezing of food, and the rapid production of ice cream without using freeze-accelerating material, thereby successive reiterative production of ice cream.

Further, a Stirling cycle refrigerator according to the present invention accomplishes the advantage that the freezing effect is excellent with a smaller volume over the conventional refrigerator.

What is claimed is:

1. A Stirling cycle refrigerator comprising:
    refrigerating supplying means including a Stirling freezing unit driven in Stirling cycle, a motor for driving said Stirling freezing unit, and a first heat transmitting part for emitting refrigeration from said Stirling freezing unit; and
    refrigerating applying means including a case, a cover covering said case, second heat transmitting part for receiving refrigeration from said first heat transmitting part, and freezing processing means for freezing contents in said case for a desired type,
    wherein said refrigerating applying means performs freezing by means of the refrigeration supplied by said refrigerating supplying means.

2. A Stirling cycle refrigerator as claimed in claim 1, wherein said freezing processing means includes a stirring motor disposed on said cover, a stirring shaft rotating in said case by being driven of said stirring motor, a stirring fan connected to said stirring shaft.

3. A Stirling cycle refrigerator as claimed in claim 1, wherein said freezing processing means is a heat transmitting lattice body removably set in said case.

4. A Stirling cycle refrigerator as claimed in claim 1, wherein said second heat transmitting part of said refrigerating applying means includes a holding wall at the periphery of the lower surface of said case, the upper surface and the outer peripheral wall of the first heat transmitting part of said refrigerating supplying means being in contact, face to face, with the lower surface of the second heat transmitting part of the refrigerating applying means and the inner surface of the holding wall.

5. A Stirling cycle refrigerator as claimed in claim 1, wherein at said first heat transmitting part of said refrigerating supplying means is formed a concave part in which heat transmitting medium can be filled, said second heat transmitting part of said refrigerating applying means including a plurality of heat transmitting pins, and said plurality of heat transmitting pins being received in said concave part in which heat transmitting medium is filled.

6. A Stirling cycle refrigerator as claimed in claim 1, wherein said first heat transmitting part of said refrigerating supplying means and said second heat transmitting part of said refrigerating applying means are a heat pipe connected incorporate with each other.

7. A Stirling cycle refrigerator comprising:
    refrigerating supplying means including a Stirling module driven in Stirling cycle, and a heat insulating plate disposed at the middle part of said refrigerating supplying means;
    refrigerating applying means including a middle plate slidably disposed at the middle part of said refrigerating applying means, means for guiding the movement of said middle plate, and freezing processing means for freezing contents in said refrigerating applying means for a desired type;

a heat transmitting part, disposed between said refrigerating supplying means and said refrigerating applying means, for transmitting refrigeration from said refrigerating supplying means to said refrigerating applying means; and a case of heat insulating material enclosing said refrigerating supplying means, said refrigerating applying means, and said heat transmitting part, and at the upper part of said case being disposed a door to be pivotally opened.

8. A Stirling cycle refrigerator as claimed in claim 7, wherein said freezing processing means consists of a motor mounted on the top of said case and a circulating fan removably connected to the rotating shaft of said motor.

9. A Stirling cycle refrigerator as claimed in claim 7, wherein said freezing processing means is an ice cream producing unit consisting of a motor mounted on said case, a container for pnroducing ice cream, a cover covering said container, a stirring shaft rotatably supported in said container through said cover and connected to the rotating shaft of said motor so as to be rotated by said motor, and a stirring fan connected to said stirring shaft.

10. A Stirling cycle refrigerator as claimed in claim 7, wherein at the outer periphery of said heat transmitting part is formed a threshold which is higher than the inner part of said heat transmitting part, a sealing element being attached to the outer surface of said threshold to maintain a seal between the inner surface of the case and said heat transmitting part, and a heat insulating coating being formed at the lower surface of said heat transmitting part.

11. A Stirling cycle refrigerator as claimed in claim 7, wherein said middle plate is an open type middle plate in a grill shape or a closed type middle plate in a plane type.

12. A Stirling cycle refrigerator as claimed in claim 11, wherein an air-tight element to maintain air-tightness between the inner surface of the wall and said closed type middle plate is attached to the periphery of said closed type middle plate.

13. A Stirling cycle refrigerator as claimed in claim 7, wherein said guiding means is guiding rails formed at either side of the inner surface of said case, in which the peripheries of either side of said middle plate are guided.

* * * * *